(12) United States Patent
Jarsch et al.

(10) Patent No.: US 12,271,199 B2
(45) Date of Patent: Apr. 8, 2025

(54) TRANSPORT SYSTEM FOR TRANSPORTING WORKPIECES AND METHOD FOR OPERATING A TRANSPORT SYSTEM OF THIS TYPE WITH A PERSONAL PROTECTION SENSOR

(71) Applicant: EISENMANN GMBH, Böblingen (DE)

(72) Inventors: Stefan Jarsch, Waldenbuch (DE); Axel Eipper, Herrenberg (DE)

(73) Assignee: EISENMANN GMBH, Böblingen (DE)

( * ) Notice: Subject to any disclaimer, the term of this patent is extended or adjusted under 35 U.S.C. 154(b) by 276 days.

(21) Appl. No.: 17/876,747

(22) Filed: Jul. 29, 2022

(65) Prior Publication Data

US 2022/0382289 A1 Dec. 1, 2022

Related U.S. Application Data

(63) Continuation of application No. PCT/EP2021/051970, filed on Jan. 28, 2021.

(30) Foreign Application Priority Data

Jan. 31, 2020 (DE) ................ 10 2020 102 513.0

(51) Int. Cl.
*G05D 1/02* (2020.01)
*B62D 65/18* (2006.01)
*G05D 1/00* (2024.01)

(52) U.S. Cl.
CPC .......... *G05D 1/0214* (2013.01); *B62D 65/18* (2013.01); *G05D 1/0055* (2013.01); *G05D 1/024* (2013.01)

(58) Field of Classification Search
CPC .... G05D 1/0214; G05D 1/0055; G05D 1/024; B62D 65/18
See application file for complete search history.

(56) References Cited

U.S. PATENT DOCUMENTS 6,265,725 B1 7/2001 Moll et al.
7,743,865 B2 6/2010 Brunner et al.
(Continued)

FOREIGN PATENT DOCUMENTS

DE 199 17 509 C1 5/2000
DE 101 10 420 A1 9/2002
(Continued)

*Primary Examiner* — Sahar Motazedi
(74) *Attorney, Agent, or Firm* — SCHROEDER INTELLECTUAL PROPERTY LAW GROUP, LLC

(57) ABSTRACT

A transport system for transporting workpieces includes a plurality of objects disposed along a path of travel and a driverless transport vehicle having a workpiece holder and a personal protection sensor such as a laser scanner. The sensor has a transmitter for generating detection radiation and a receiver adapted to receive detection radiation generated by the transmitter and reflected from persons or objects located in a monitoring area that is monitored by the detection radiation. A control device steers the transport vehicle along the travel path so that it does not collide with the objects and triggers a safety measure if the personal protection sensor has detected a person in the monitoring area. The objects support a coating or cladding that absorbs detection radiation impinging thereon or reflects it in such a direction that it cannot reach the receiver. As a result, the objects become invisible to the personal protection sensor and cannot trigger any safety measures.

20 Claims, 4 Drawing Sheets

(56) References Cited

U.S. PATENT DOCUMENTS

| | | | |
|---|---|---|---|
| 8,406,950 B2 | 3/2013 | Erb et al. | |
| 10,615,507 B1* | 4/2020 | Wilcox | H01Q 15/148 |
| 2002/0149760 A1 | 10/2002 | Hipp | |
| 2007/0107966 A1 | 5/2007 | Brunner et al. | |
| 2007/0273490 A1 | 11/2007 | Fuchs et al. | |
| 2011/0153139 A1 | 6/2011 | Erb et al. | |
| 2014/0114526 A1 | 4/2014 | Erb | |
| 2021/0116563 A1* | 4/2021 | Decker | C09D 5/004 |

FOREIGN PATENT DOCUMENTS

| | | | |
|---|---|---|---|
| DE | 103 41 128 A1 | 3/2005 | |
| DE | 10 2005 054 359 A1 | 5/2007 | |
| DE | 2010 021 042 A1 | 11/2011 | |
| DE | 20 2012 010 014 U1 | 1/2014 | |
| DE | 20 2016 100 485 U1 | 2/2016 | |
| DE | 10 2016 216 320 A1 | 3/2018 | |
| DE | 10 2018 215 885 A1 | 3/2020 | |
| EP | 2 339 376 A1 | 6/2011 | |
| EP | 2 722 687 A1 | 4/2014 | |
| EP | 3 330 740 A1 | 6/2018 | |
| WO | WO-2012094498 A2 * | 7/2012 | H01Q 17/00 |

\* cited by examiner

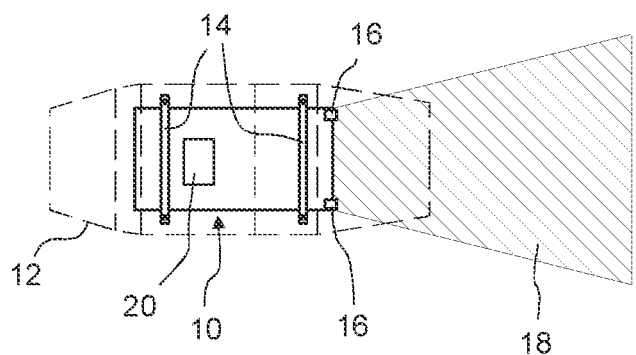
Fig. 1
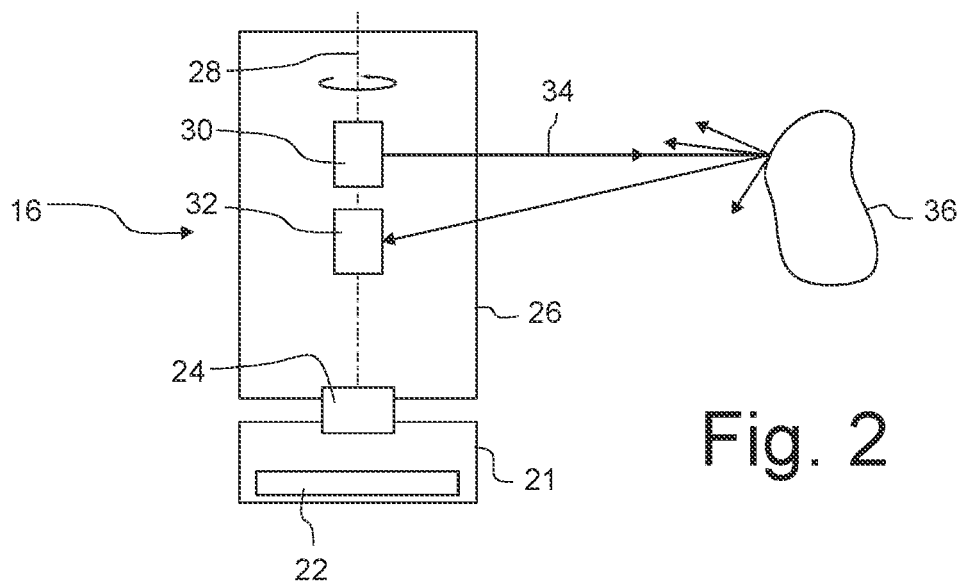
Fig. 2
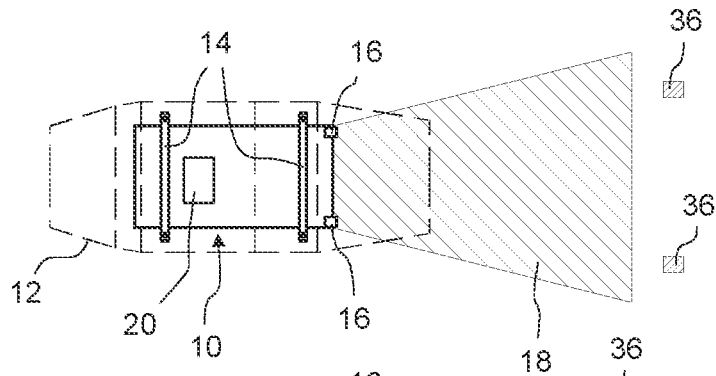
Fig. 3
Fig. 4
(Prior Art)
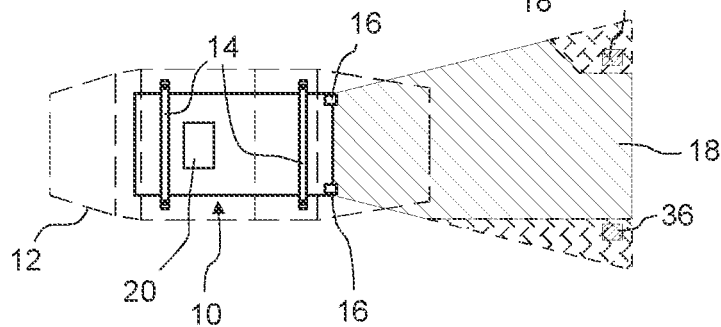

TRANSPORT SYSTEM FOR TRANSPORTING WORKPIECES AND METHOD FOR OPERATING A TRANSPORT SYSTEM OF THIS TYPE WITH A PERSONAL PROTECTION SENSOR

CROSS-REFERENCE TO RELATED APPLICATIONS

The present application is a continuation of International Patent Application No. PCT/EP2021/051970 filed Jan. 28, 2021 which claims priority to, and the filing benefit of, German patent application 10 2020 102 513.0 filed Jan. 31, 2020. The full disclosures of these patent applications are incorporated herein by reference.

BACKGROUND OF THE INVENTION

1. Field of the Invention

The invention relates to a transport system for transporting vehicle bodies or other workpieces. The system comprises driverless transport vehicles that are equipped with a personal protection sensor.

2. Description of Prior Art

Driverless transport vehicles are usually equipped with an optical personal protection sensor, which is mounted on the front of the vehicle and detects whether persons are in a monitoring area ahead in the direction of travel. The monitoring area is often divided into a warning field and a protective field, the size and shape of which can be defined independently of one another. If a person is detected in the warning field, this leads to the emission of visual or audible warnings and/or a reduction in vehicle speed, depending on the design of the safety system.

Further safety measures are triggered if a person is in the protective field. In general, the vehicle then brakes with maximum deceleration to avoid a collision. The dimensions of the protective field must therefore take into account the stopping distance of the vehicle. One problem with such systems is that the personal protection sensor cannot differentiate between people and objects. Therefore, objects detected in the monitoring area also trigger safety measures. Without additional measures, such a driverless transport vehicle could not, for example, pass between two posts whose distance is only slightly greater than the width of the transport vehicle. Usually, these measures consist of either briefly switching off the monitoring area (so-called muting) or limiting its dimensions so that the stationary objects causing interference are no longer detected.

EP Pat. Pub. No. 3 330 740 discloses a safety device in which the protective field has speed-dependent dimensions. In addition, the shape of the protective field is modified in its form by means of a teach-in process. If the transport vehicle approaches a wall or another object during teach-in, for example, the contour of the object is detected by the optical sensor and the protective field is reduced in size so that no unintentional emergency stops or other safety measures occur during subsequent travels along the same route.

However, such a learning process is hardly possible for transport vehicles that do not travel on fixed routes but on routes that are variable—at least within certain limits. Even if the travel paths are fixed, this known safety device is not very flexible in its handling. If, for example, a new object is placed in the vicinity of a predefined travel path, a new teach-in process must be carried out because otherwise the optical sensor detects the new object as it passes and triggers a safety measure.

Temporarily switching off the monitoring area (muting) is also not a practicable solution, since switching off involves non-negligible safety risks.

SUMMARY OF THE INVENTION

It is an object of the invention to specify a transport system as well as a method for operating a transport system which makes it possible to reliably detect persons in a monitoring area of the transport vehicles without having to prevent disturbances by objects by means of complex learning processes.

In some embodiments, this object may be achieved by a transport system for transporting workpieces, which has a travel path, a plurality of objects arranged along the travel path and a driverless transport vehicle, which has a workpiece holder and a personal protection sensor. The personal protection sensor includes a transmitter for generating detection radiation and a receiver configured to receive detection radiation generated by the transmitter and reflected from persons and objects located in a monitoring area detected by the detection radiation. The transport system further comprises a control device adapted to control the transport vehicle along the path of travel so that it does not collide with the objects. The control device triggers a safety measure if the personal protection sensor has detected a person in the monitoring area. According to the invention, the objects carry a coating or cladding that absorbs detection radiation incident thereon or reflects it in such a direction that it cannot reach the receiver.

The invention is based on the consideration that in many applications of driverless transport vehicles it is simpler to make the objects whose detection by the personal protection sensor leads to unwanted delays or interruptions in the operating sequence invisible to the personal protection sensor by optical rather than electronic means. This is because if the detection radiation incident on an object can no longer return to the receiver, the object in question can no longer be detected by the personal protection sensor, with the result that safety measures cannot be triggered.

When it is said that no more detection radiation can reach the receiver, this is not to be understood strictly literally in the sense that the intensity incident on the receiver is exactly zero. In general, despite the coating or cladding carried by the objects, detection radiation will still reach the receiver as a result of scattering processes from dirt particles that are in the air or on the directionally reflecting cladding. However, the intensity of this scattered radiation is so low that it either cannot be detected by the receiver or is below a threshold value at which the receiver assumes that the detection radiation has been reflected by a person or object.

Directional reflection is a reflection for which the law of reflection (angle of incidence is equal to angle of reflection) applies. Directional reflection occurs only on smooth surfaces. In contrast, radiation on rough surfaces is diffusely scattered in different directions.

The invention is particularly advantageous when the transport vehicle can move along many different travel paths and/or the arrangement of the objects changes more frequently. Of course, such changes must also be taken into account by the control device in the transport system according to the invention so that it can control the transport vehicle in such a way that no collisions with the objects occur. For this purpose, however, it is sufficient to store the coordinates and dimensions of the objects once in the control system.

If the transport vehicle approaches such an object from different directions, the control system can reliably avoid collisions with the object. In conventional transport systems, however, the monitoring area must then also be adjusted for each possible travel path by means of the teach-in process described above, which is very time-consuming.

With the transport system according to the invention, on the other hand, no teach-in processes are required in such a case, since the object is invisible to the personal protection sensor of the transport vehicle due to the coating or cladding worn by it. Consequently, it is also not necessary to reduce the monitoring area when the transport vehicle approaches the object. Since the monitoring area does not have to be modified in the transport system according to the invention, the actual function of the personal protection sensor of avoiding collisions with persons is not restricted at any time, in contrast to the known transport systems.

However, the invention can also be used to advantage in transport systems in which the transport vehicles are rail-bound or operate on other fixed routes. Here, too, time-consuming teach-in processes become superfluous.

Which safety measure is triggered by the control device when the personal protection sensor detects a person in the monitoring area can be made dependent on, among other things, where the detected person is located in the monitoring area, as is the case with known transport systems. For example, if the monitoring area is divided into a warning zone and a protection zone, an optical or acoustic warning signal is often sufficient when a person is detected in the warning zone. If, on the other hand, the person is in the protection zone, the transport vehicle must be brought to a standstill as quickly as possible.

If visible light is used as the detection radiation, the coating or cladding should be reflective, since a black coating is not sufficient to make the objects invisible to the personal protection sensor. It must be taken into account that the personal protection sensor must also be able to reliably detect a person wearing black and thus highly absorbent clothing.

For other wavelengths, however, absorbent materials can be used that are not suitable for people's clothing. For example, when using long-wave infrared radiation, vanadium dioxide can be used as an absorber, which has an absorption coefficient of almost 1. If, on the other hand, the detection radiation is radar radiation, materials known from stealth technology can be used, for example foam absorbers or so-called Dallenbach absorbers. Especially if the absorbing material can be applied as a varnish, it is particularly easy to make objects invisible to the personal protection sensor in this way.

In order to achieve a sufficiently high spatial resolution, however, the wavelength of the detection beams should not be too large. The personal protection sensor therefore preferably uses wavelengths that lie in a range between 250 nm and 1 cm. As a rule, the transmitter of the personal protection sensor uses only a very narrow frequency band in this range. Infrared light with wavelengths between 780 nm and 50 µm is particularly suitable.

Most known personal protection sensors are designed as laser scanners. In laser scanners, a laser source or a scanning mirror rotates, whereby the laser beam completely sweeps a plane. However, personal protection sensors are also known in which several laser diodes arranged next to each other emit the light in a fan-like manner, as described for example in US Pat. Pub. No. 2002/0149760.

If the detection radiation generated by the personal protection sensor propagates in a plane that is at least approximately parallel to a ground surface on which the transport vehicle is moving, it is sufficient for the objects to bear the coating or cladding not completely, but only within a height section that is intersected by the plane. This takes into account the fact that the objects in areas where detection beams cannot impinge under any circumstances also do not require coatings or claddings to make them invisible to the personal protection sensor. The width of the height section within which coatings or coverings must be provided depends on many parameters. For example, tilting movements must be taken into account that the personnel protection scanner performs together with the transport vehicle when driving over uneven ground, inclines or as a result of acceleration processes. Each tilting movement about a horizontal axis causes the monitoring area to tilt. The longer the monitoring range, the more the end of the monitoring range swings out during tilting movements.

In order for a coating or cladding to reflect the detection radiation incident thereon in such a directional manner that it cannot reach the receiver, the reflection must be directional, and in such a manner that the incident detection radiation is not reflected back into itself.

In order to be able to freely determine the direction of reflection, it is easiest if the objects carry a cladding that has a mirror-coated support. The cladding can then be aligned so that the incident reflection radiation is not reflected back into itself. For example, the support may comprise a plastic film, a cardboard, a metal plate or a glass plate. However, a metal foil can also be used as a covering, which is particularly easy to apply to objects subsequently. To avoid back reflections, however, it may be necessary to stretch the metal foil onto a frame or the like attached to the object, depending on the external contour of the objects.

It is particularly simple if the support of the cladding is aligned in such a way that the plane of incidence of the detection radiation is vertically aligned. If the plane of incidence, which is spanned by the direction of incidence of the detection radiation and the surface normal of the support at the point of incidence, is vertically aligned, this means graphically that the incident detection radiation is deflected upwards or downwards. If the transport vehicle has several personal protection sensors, these are usually arranged at the same height, so that detection radiation deflected upwards or downwards cannot be detected by another personal protection sensor.

Particularly in the case of vertically extending legs, supports, columns or similar objects, it makes sense to give the support at least a sectionally conical shape. Such a support can be manufactured inexpensively, can be attached to the object in question at the required height by simple means, and reliably deflects incident detection radiation upwards or downwards so that it can no longer reach the personal protection sensor.

With regard to the method, the task mentioned at the beginning is solved by a method for operating a transport system for transporting workpieces, which has the following steps:
 a) Providing a transport system comprising a driverless transport vehicle having a workpiece holder and a personal protection sensor comprising a transmitter for generating detection radiation and a receiver, wherein the receiver is adapted to receive detection radiation generated by the transmitter and reflected from persons or objects located in a monitoring area detected by the detection radiation, b) Applying a coating or cladding to objects located along a path of travel for the transport vehicle, the coating or cladding absorbing or reflecting detection radiation incident thereon in such a direction that it cannot reach the receiver;

c) Steering the transport vehicle along the travel path so that it does not collide with the objects.

Other advantages and aspects of the present invention will become apparent upon reading the following description of the drawings and detailed description of the invention.

BRIEF DESCRIPTION OF THE DRAWINGS

Various features and advantages of the present invention may be more readily understood with reference to the following detailed description taken in conjunction with the accompanying drawings in which:

FIG. 1 a schematic top view of a transport vehicle according to the invention;

FIG. 2 a schematic side view of a personal protection sensor arranged in the transport vehicle according to FIG. 1;

FIG. 3 the transport vehicle shown in FIG. 1 approaching stationary objects;

FIG. 4 a top view, corresponding to FIG. 3, of a transport vehicle known from the prior art, in which the monitoring area is reduced in size as the vehicle approaches in order to avoid interference from objects;

DETAILED DESCRIPTION OF EMBODIMENTS

Figure 5A:
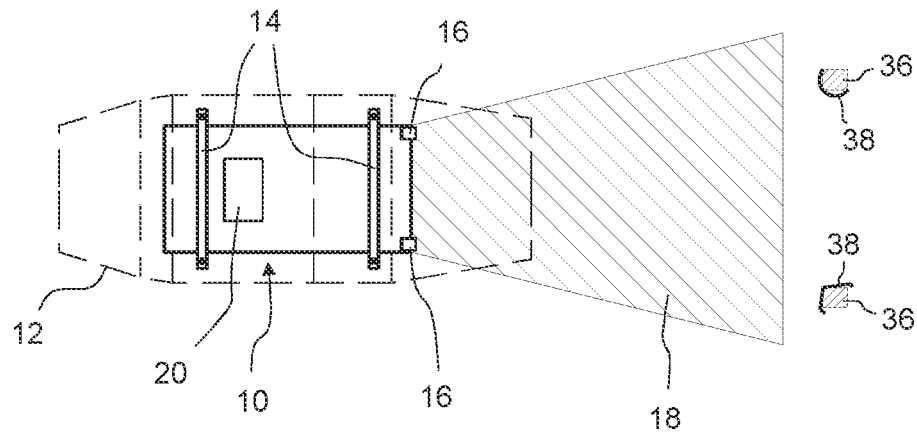
FIGS. 5a and 5b representations corresponding to FIG. 1 of a transport vehicle approaching objects disguised according to the invention before and after the objects enter the monitoring area.

While the present invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

FIG. 1 shows a schematic top view of a transport vehicle according to the invention, which is designated 10. The contour of a vehicle body 12, which is supported by a workpiece holder 14 of the transport vehicle 10, is indicated by dashed lines. Two personal protection sensors 16 are arranged at the front end of the transport vehicle 10, the task of which is to detect persons located in a monitoring area 18 ahead and indicated by hatching in FIG. 1. For the sake of simplicity, it is assumed that the monitoring area 18 does not comprise a warning field, but consists only of a protective field. If one of the two personal protection sensors 16 detects a person in the monitoring area 18, a control device 20 of the transport vehicle 10 triggers a safety measure, which can be, for example, an emergency stop of the transport vehicle 10.

FIG. 2 shows an exemplary design of one of the personal protection sensors 16. The personal protection sensor 16 comprises a foot part 21 in which an evaluation unit 22 is arranged. The foot part 21 is connected to a housing 26 via a rotary bearing 24, which can be set in rotation about an axis of rotation 28 by means of a drive which is not shown. A transmitter 30 and a receiver 32 are arranged in the housing 26, which rotate along with the housing 26. The transmitter 30, which may be in the form of a laser diode, emits a light beam 34 during operation of the personal protection sensor 16, which eventually strikes an object 36. In the illustrated embodiment, infrared light with a wavelength of 905 nm is generated by the transmitter 30.

The light beam 34 is diffusely reflected at the surface of the object 36. A small portion of the reflected light returns to the receiver 32, where it is detected by a photodiode or other light-sensitive electronic component. In order to be able to locate the object 36, the travel time of the light beam 34 to the object 36 is determined, from which the distance to the object 36 can be derived. At the same time, the current rotational position of the housing 26 is detected. In this way, a distance profile of the environment is obtained within the plane swept by the light beam 34 during rotation about the axis of rotation 28.

In order to define the lateral limits of the monitoring area 18, only those distance data are taken into account where the housing 26 is in a certain angular range. In order to determine the length of the monitoring range 18, only those distances are considered which are smaller than the desired length. Thus, by combining the angular position and the distances considered, the shape and size of the monitoring area 18 can be freely determined within certain limits.

If the vehicle 10 approaches two objects 36, as illustrated in FIG. 3, they will eventually enter the monitoring area 18. Since the personal protection sensors 16 cannot detect whether the objects 36 are objects that are in their intended location and do not pose a danger to the transport vehicle 10 or people who happen to be in that location, the control device 20 must initiate an emergency stop or other safety measure as soon as the transport vehicle 10 has approached the objects 36 to the point that they enter the monitoring area 18.

In order to avoid such undesirable interruptions or delays in the travel of the transport vehicle 10, in conventional transport systems the monitoring area 18 is modified when the transport vehicle 10 approaches the objects 36, as illustrated in FIG. 4. To do this, the transport vehicle 10 first passes between the two objects 36 along the predetermined path of travel by way of a teach-in process not shown. When the personal protection sensors 16 detect the objects 36, the monitoring area 18 is automatically reduced so that the objects 36 are outside the monitoring area 18. In this way, the transport vehicle 10 can pass between the objects 36 without the personal protection sensors 16 triggering safety measures.

Thus, in the known transport systems, the objects 36 are visually detected by the personal protection sensors 16, but are computationally ignored because it is known after the teach-in process that stationary objects 36 are located at the depicted positions. Since the distance data to the objects 36 is available, it can also be used by the control device 20 for navigation to enable safe passage of the transport vehicle 10 between the objects 36.

However, the teach-in process described above is complex and often requires the involvement of software specialists. Furthermore, this approach only works if the transport vehicle 10 approaches the objects 36 exactly along the travel path on which the teach-in process was based. If, for example, the transport vehicle 10 approaches the objects 36 in a curved path, they may enter the monitoring area 18 and trigger a safety measure. A further disadvantage is that, at least temporarily, the monitoring area 18 must be reduced in size, as shown in the bottom right of FIG. 4. No persons can be detected in this area, which can lead to safety risks.

Figure 5B:
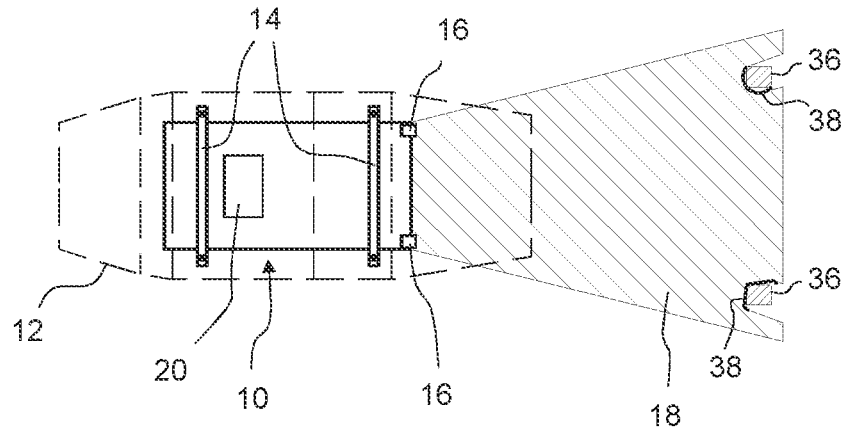

FIGS. 5a and 5b show a transport system according to the invention in representations based on FIGS. 3 and 4. The transport vehicle 10 with the personal protection sensors 16 is structurally exactly the same as in the prior art. However, the control device 20 need not have the capability to modify the monitoring area 18 by way of a teach-in process.

Modification of the monitoring area 18 is not required in the transport system according to the invention because the objects 36 wear coverings 38 that make the objects 36 invisible to the personal protection sensors 16.

Figure 6:
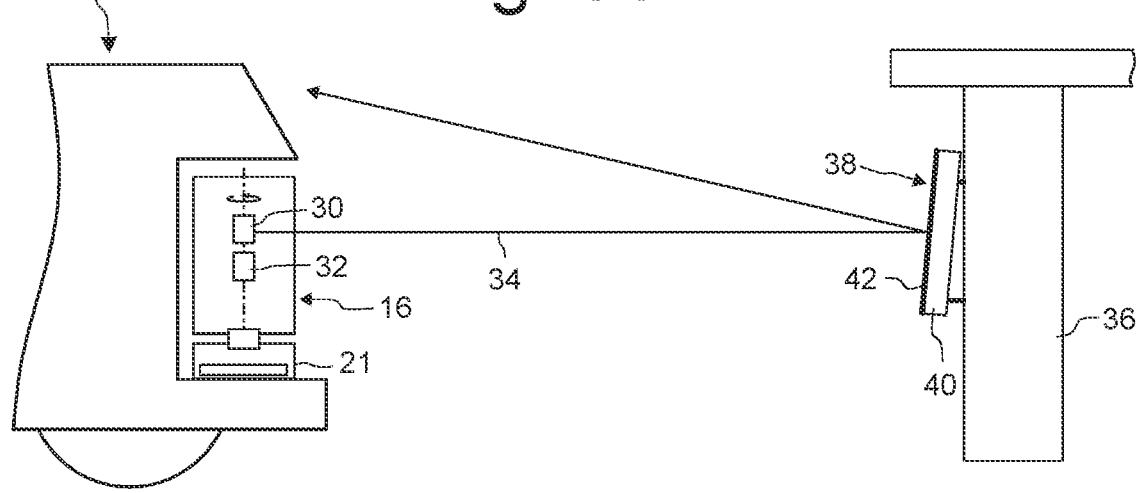
FIG. 6 a schematic side view of a front section of the transport vehicle and a clad object.

FIG. 6 shows this principle in a schematic side view. Attached to the object 36 is a support 40 which carries a directionally reflective coating 42. The support 40 may, for example, be made of plastic, cardboard, metal or glass and carries a thin metal layer applied, for example, by vapor deposition. The substantially planar support 40 is attached to the object 36 such that the surface normal is not horizontal, but at an angle thereto. The plane of incidence, which is spanned by the direction of incidence of the incident light beam 34 and the surface normal, is thus vertically oriented and extends in the plane of the paper. A light beam 34 of a personal protection sensor 16 impinging on the coating 42 is therefore not reflected back into itself, but deflected upwards, whereby it can no longer reach the receiver 32 of the personal protection sensor 16.

Thus, due to the shroud 38, the object 36 is invisible to the personal protection scanner 16. Since the receiver 32 of the personal protection sensor 16 does not receive any reflected light when the light beam 34 is in the position shown, the personal protection sensor 16 assumes that the light beam 34 has never encountered an obstacle.

If an object 36 disguised in this way enters the monitoring range 18 of the personal protection sensors 16, as shown in FIG. 5b, this merely means that persons behind the objects 36 cannot be detected. This is no different in the prior art and does not pose a problem, since in such a case the person is protected by the object 36. In contrast to the prior art, however, the monitoring area 18 remains completely unchanged in its size and thus does not have to be computationally modified in its dimensions. The previously necessary time-consuming learning processes, which can usually only be mastered with the help of software experts, can be omitted. All that is required is to provide the objects 36 that are located in the vicinity of the possible travel paths of the transport vehicle with suitable coverings 38.

Preferably, the lateral vertical edges of the support 40 are rounded so that interference effects at the edges do not lead to detection of the support 40.

Figure 7:
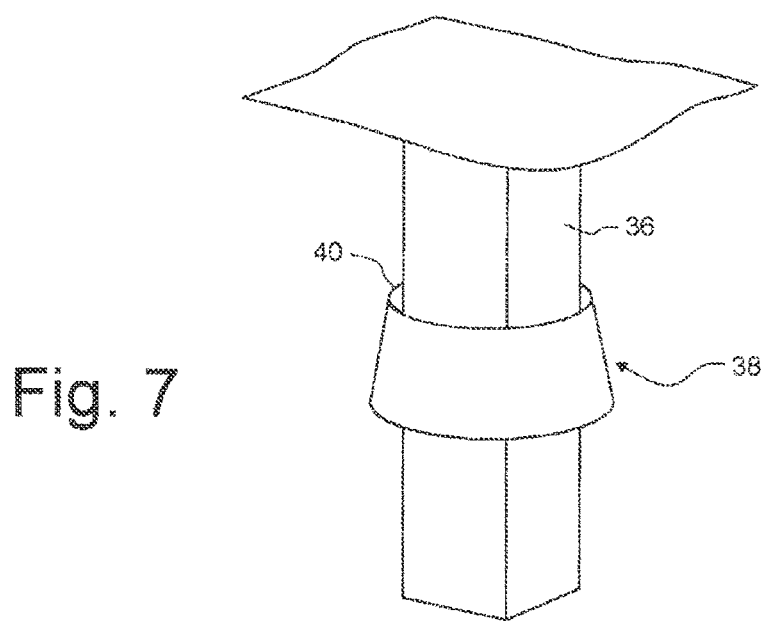
FIG. 7 a perspective view of a pillar-shaped object carrying a cladding according to the invention.

In many cases, the objects 36 are vertically extending legs, pillars or columns. FIG. 7 shows such an object 36 with a cladding 38 supported thereby in a schematic perspective view. Here, the cladding 38 comprises a cardboard support 40 coated with an aluminum foil and having the shape of a conical shell section. The cladding 38 is provided as a curved band and is simply wrapped around the object 36, joined at the ends and secured at the desired height. In this manner, the entire object 36 has been rendered invisible to the personal security scanners by simple mechanical means.

FIGS. 8 to 11 show possible application examples for the transport system according to the invention.

Figure 8:
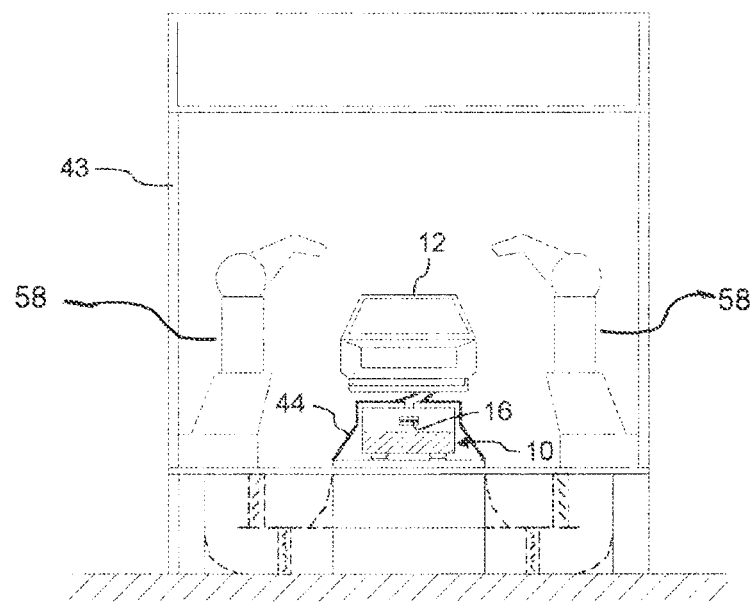
FIG. 8 a schematic cross-section through a paint booth in which a transport vehicle according to the invention conveys a vehicle body while being protected by a tunnel.

FIG. 8 shows a cross-section of a paint booth 43. In this application, the transport vehicle 10 with a personal protection sensor 16 arranged at the front is located in a tunnel 44 which protects the transport vehicle 10 from overspray. Overspray is defined as paint particles that are created by atomization and have not settled on the surface to be coated.

In the illustrated embodiment example, rotary atomizers are used for atomization, which are guided by painting robots 58 over the vehicle bodies 12 conveyed by the transport vehicle 10.

The interior surfaces of the tunnel 44 have reflective coatings or wear reflective facings to make them invisible to the personal protection sensor 16.

Figure 9:
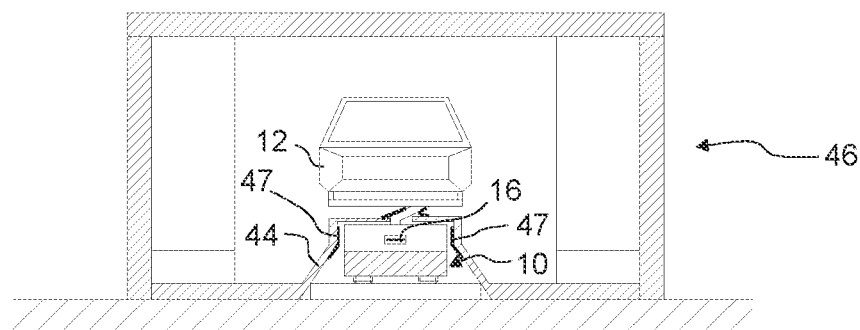
FIG. 9 a schematic cross-section through a dryer in which a transport vehicle according to the invention conveys a vehicle body while being protected by a tunnel.

FIG. 9 shows a schematic cross-section of a transport vehicle 10 which is also guided in a tunnel 44. However, the tunnel 44 is not located in a paint booth 43 here, but in a dryer 46. The tunnel 44 protects the transport vehicle 10 from the heat prevailing in the dryer 46. In this embodiment, the personal protection sensor 16 emits microwaves. The inner wall of the tunnel 44 is coated with a Dallenbach absorber 47, which reflects the incident microwaves in a phase-shifted manner, resulting in suppression of the reflection due to destructive interference.

Figure 10:
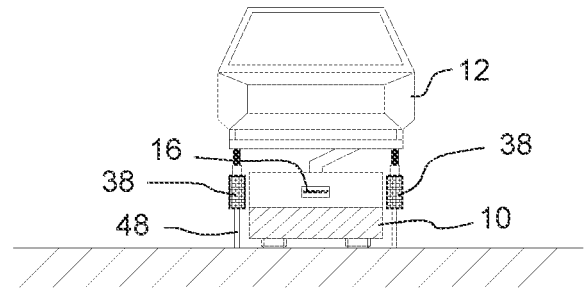
FIG. 10 a schematic cross-section through a support structure on which a transport vehicle according to the invention deposits a vehicle body.

FIG. 10 shows a transport vehicle 10 transferring a vehicle body 12 to a support structure 48 on which the vehicle body 12 is placed. The legs of the support structure 48, between which the transport vehicle 10 must pass, also represent objects which can be made invisible to the personal protection sensor 16 in the manner according to the invention.

In this embodiment, the personal protection sensor 16 of the transport vehicle 16 emits radar radiation. The legs of the support structure 48 carry cylindrical claddings 38 designed as foam absorbers, which absorb the incident radar radiation, making the legs invisible to the personal protection sensor 16.

Figure 11:
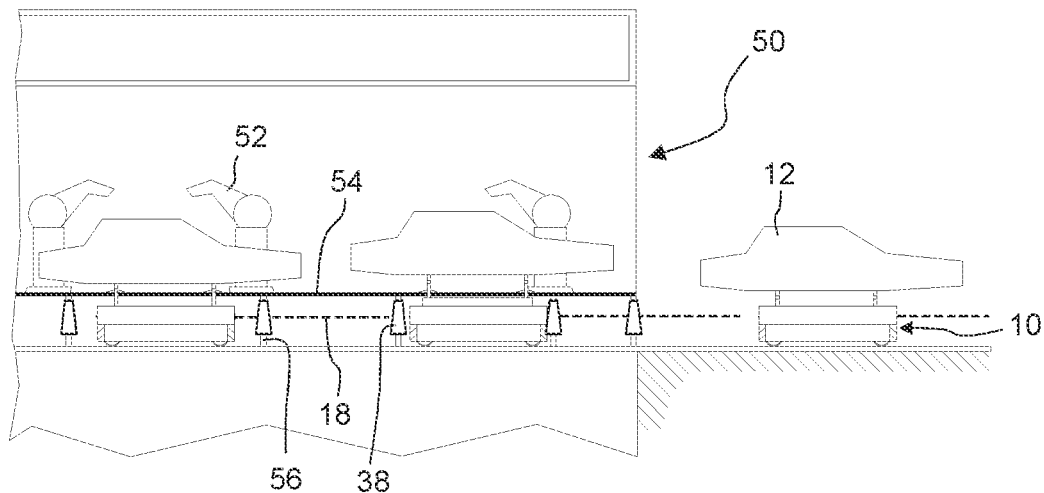
FIG. 11 a schematic longitudinal section through an assembly section of a production line in which several transport vehicles according to the invention move underneath an assembly platform which is elevated by means of covered supports.

FIG. 11 shows several transport vehicles 10 moving through an assembly section 50 of a production line. The robots 52 used for assembly are located on a raised assembly platform 54, which is elevated with respect to a moving floor for the vehicles 10 by means of supports 56. The supports 56 represent objects which, in the manner according to the invention, must be made invisible to the personal protection sensors 16, since they are located in the monitoring area 18 of the personal protection sensors 16 indicated by a dashed line. For this purpose, the supports carry directionally reflective coverings 38, as shown in FIG. 7.

While in the foregoing there has been set forth preferred embodiments of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

What is claimed is:

1. A transport system for transporting workpieces, comprising:
   a travel path,
   several objects arranged along the travel path,
   an unmanned transport vehicle comprising a workpiece holder and a personal protection sensor, wherein the personal protection sensor comprises
      a transmitter for generating detection radiation in a monitoring area and
      a receiver configured to receive the detection radiation generated by the transmitter and reflected from persons or objects located in the monitoring area monitored by the detection radiation, and
   a control device configured to
      steer the transport vehicle along the travel path in such a way that it does not collide with the objects arranged along the travel path, and
      trigger a safety measure if the personal protection sensor has detected a person in the monitoring area,
   wherein
   at least one object of the objects located in arranged along the travel path comprises, in order to make the at least one object invisible to the personal protection sensor even when the at least one object is located in the monitoring area, a coating or a cladding that absorbs the detection radiation impinging thereon or reflects it in such a direction that it cannot reach the receiver.

2. The transport system of claim 1, wherein the personal protection sensor is a laser scanner.

3. The transport system of claim 1, wherein the detection radiation generated by the personal protection sensor propagates in a plane arranged at least approximately parallel to a ground surface on which the transport vehicle moves, and wherein the at least one object comprises the coating or the cladding only in a height portion which is traversed by said plane.

4. The transport system of claim 1, further comprising a support attached to the at least one object, the support comprising the coating or the cladding, wherein the cladding comprises a mirror-coated support.

5. The transport system of claim 4, wherein the support is selected from a group consisting of a plastic film, a cardboard, a metal plate and a glass plate.

6. The transport system of claim 5, wherein the support is oriented such that a plane of incidence of the detection radiation is oriented vertically.

7. The transport system of claim 6, wherein the support has at least a portion which is conical in shape.

8. A method for operating a transport system for transporting workpieces, wherein the method comprises the following steps:
   a) providing a transport system comprising a driverless transport vehicle having a workpiece holder and a personal protection sensor that comprises a transmitter configured to generate detection radiation in a monitoring area and a receiver, wherein the receiver is configured to receive the detection radiation generated by the transmitter and reflected from persons or objects located in the monitoring area that is monitored by the detection radiation,
   b) applying a coating or a cladding to objects disposed along a path of travel for the transport vehicle in order to make the objects disposed along the path of travel invisible to the personal protection sensor even when the objects disposed along the path of travel are located in the monitoring area, wherein the coating or the cladding absorbs the detection radiation incident thereon or reflects it in such a direction that it cannot reach the receiver, and
   c) steering the transport vehicle along the path of travel so that it does not collide with the objects disposed along the path of travel and triggering a safety measure when the personal protection sensor has detected a person in the monitoring area.

9. The method of claim 8, wherein the personal protection sensor is a laser scanner.

10. The method of claim 8, wherein the detection radiation generated by the personal protection sensor propagates in a plane arranged at least approximately parallel to a ground surface on which the transport vehicle moves, and wherein the coating or the cladding is applied to the objects disposed along the path of travel only in a height portion which is traversed by said plane.

11. The method of claim 8, further comprising the step of attaching a support to at least one of the objects disposed along the path of travel, the support comprising the coating or the cladding, wherein the cladding comprises a mirror-coated support.

12. The method of claim 11, wherein the support is selected from group consisting of a plastic film, a cardboard, a metal plate and a glass plate.

13. The method of claim 12, wherein the support is oriented such that a plane of incidence of the detection radiation is oriented vertically.

14. The method of claim 13, wherein the support has at least a portion which is conical in shape.

15. A transport system for transporting workpieces, comprising:
   a travel path,
   several objects arranged along the travel path,
   an unmanned transport vehicle comprising a laser scanner, wherein the laser scanner comprises
      a transmitter for generating detection radiation in a monitoring area and
      a receiver configured to receive the detection radiation generated by the transmitter and reflected from persons or objects located in the monitoring area that is monitored by the detection radiation, and
   a control device configured to trigger a safety measure if the laser scanner has detected a person in the monitoring area and to steer the transport vehicle along the travel path in such a way that it does not collide with the objects arranged along the travel path,
   wherein
   at least one object of the objects arranged along the travel path comprises, in order to make the at least one object invisible to the laser scanner even when the at least one object is located in the monitoring area, a coating or a cladding that absorbs the detection radiation impinging thereon or reflects it in such a direction that it cannot reach the receiver.

16. The transport system of claim 15, wherein the detection radiation generated by the laser scanner propagates in a plane arranged at least approximately parallel to a ground surface on which the transport vehicle moves, and wherein the at least one object comprises the coating or the cladding is only in a height portion which is traversed by said plane.

17. The transport system of claim 15, further comprising a support attached to the at least one object, the support comprising the coating or the cladding, wherein the cladding comprises a mirror-coated support.

18. The transport system of claim 17, wherein the support is selected from a group consisting of a plastic film, a cardboard, a metal plate and a glass plate.

19. The transport system of claim 17, wherein the support is oriented such that a plane of incidence of the detection radiation is oriented vertically.

20. The transport system of claim 19, wherein the support has at least a portion which is conical in shape.

* * * * *

UNITED STATES PATENT AND TRADEMARK OFFICE
CERTIFICATE OF CORRECTION

| | |
|---|---|
| PATENT NO. | : 12,271,199 B2 |
| APPLICATION NO. | : 17/876747 |
| DATED | : April 8, 2025 |
| INVENTOR(S) | : Stefan Jarsch and Axel Eipper |

It is certified that error appears in the above-identified patent and that said Letters Patent is hereby corrected as shown below:

In the Claims

| | |
|---|---|
| Column 9, Claim 1, Line 24 | delete the phrase "located in" |
| Column 10, Claim 12, Line 26 | insert the word -- a -- after the word "from" |
| Column 10, Claim 16, Line 63 | delete the first occurrence of the word "is" |

Signed and Sealed this
Eleventh Day of November, 2025

John A. Squires
*Director of the United States Patent and Trademark Office*